March 6, 1956 — F. E. STUART — 2,737,123
PASSENGER CHECKING STRUCTURE
Filed May 13, 1952 — 2 Sheets-Sheet 1
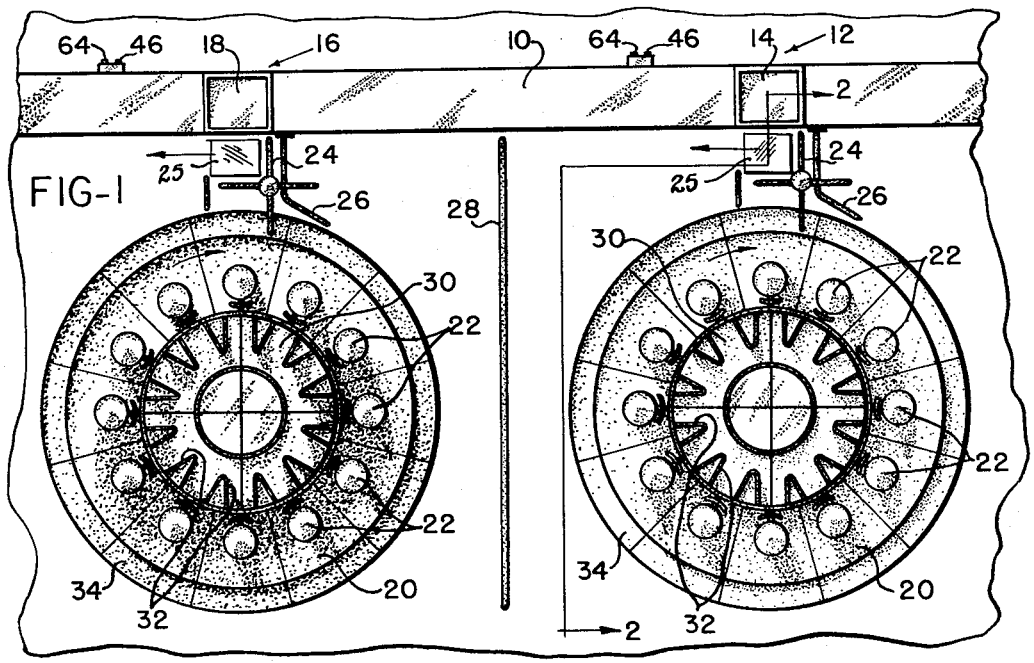
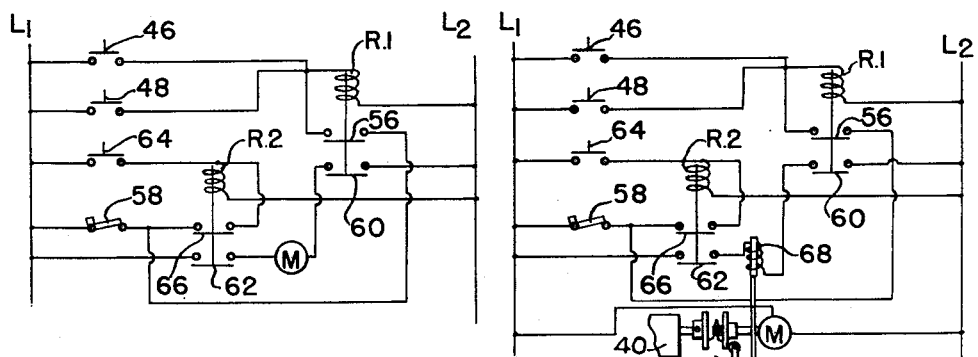
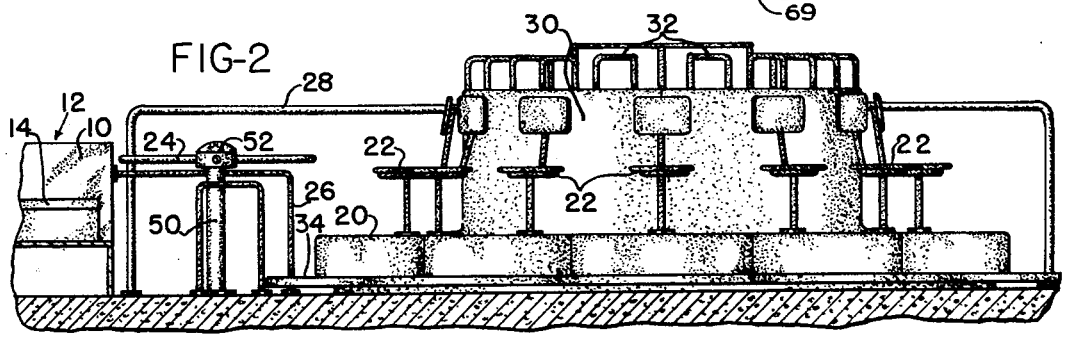
INVENTOR
FRED E. STUART
BY Toulmin & Toulmin
ATTORNEYS March 6, 1956  F. E. STUART  2,737,123
PASSENGER CHECKING STRUCTURE
Filed May 13, 1952  2 Sheets-Sheet 2
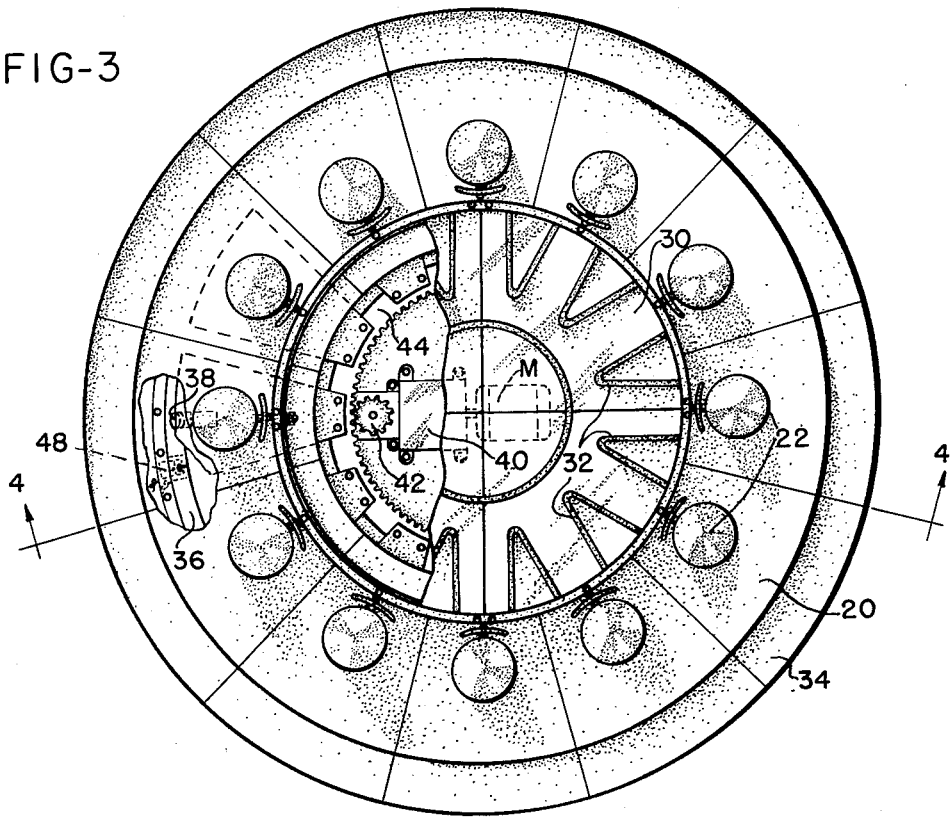
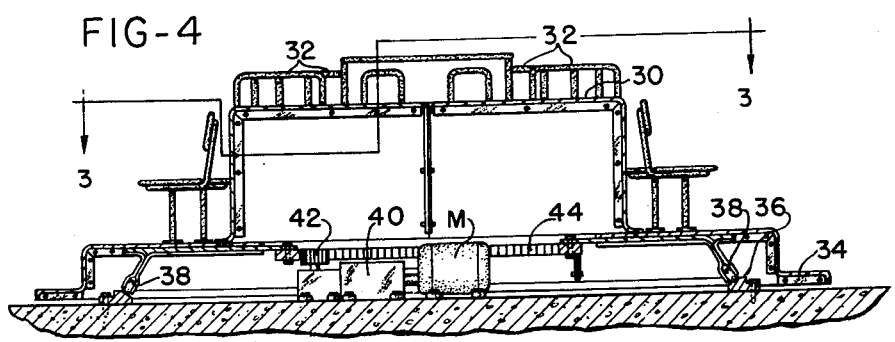
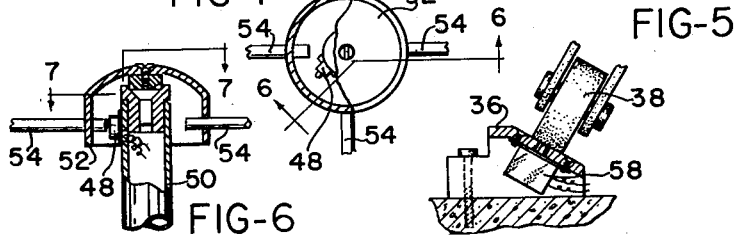
INVENTOR
FRED E. STUART
BY Toulmin & Toulmin
ATTORNEYS

United States Patent Office 2,737,123
Patented Mar. 6, 1956

2,737,123

PASSENGER CHECKING STRUCTURE

Fred E. Stuart, Baltimore, Md.

Application May 13, 1952, Serial No. 287,641

6 Claims. (Cl. 104—28)

This invention relates to a method of checking passengers at airports, train stations, and the like and to apparatus particularly designed for use in the practice of the method.

In the checking in of passengers, particularly in airports, considerable confusion sometimes exists and it is difficult for the passenger agent to maintain the proper degree of order and to be certain that the passengers are checked in in the order that they arrive at the checking-in station. Further, in checking in of passengers at an airport, the passengers bring their baggage to the passenger agent's station and at which time it is weighed to determine if it is within the limit permitted without the payment of extra tariff. With the passengers carrying baggage, the difficulty of having them move into the checking-in station where the scale is located and of taking them in the proper order is made still more difficult.

Having the foregoing in mind, the particular object of the present invention is the provision of a method and apparatus for checking in passengers which will eliminate the difficulties referred to above.

A particular object is the provision of a movable arrangement on which the passengers can be seated and which will move past the checking-in station whereby the passengers will be taken in the proper order and checked in without confusion.

Another object is the provision of a movable conveyor for carrying passengers to a checking-in station which operates automatically upon one passenger leaving the conveyor to prepare a control circuit for the conveyor drive means to be completed by the checking-in agent to move the conveyor to bring the next passenger into checking-in position.

A still further object of this invention is the provision of a control system for a conveyor arrangement of the nature referred to which substantially prevents any accidental or inadvertent movement of the conveyor by either the passengers or the passenger agent.

These and other objects and advantages of the present invention will be more apparent upon reference to the following specification taken in connection with the accompanying drawings, in which:

Figure 1 is a plan view showing two checking-in stations and two turntable type conveyors associated therewith according to the present invention.

Figure 2 is a view indicated by line 2—2 on Figure 1 showing one of the turntable conveyors from the side.

Figure 3 is a plan view of one of the turntable conveyors drawn at a scale greater than that employed in Figure 1 and with a portion of the center part of the turntable broken out to show the drive therefor, and is indicated by line 3—3 on Figure 4.

Figure 4 is a vertical transverse section indicated by line 4—4 on Figure 3.

Figure 5 is a fragmentary view showing the manner in which the turntable is rotatably supported on the annular track and the manner in which a supporting roller of the turntable is adapted for actuating a controlling limit switch.

Figure 6 is a vertical transverse section through the upper end of a turnstile associated with the checking-in station through which the passengers pass upon leaving the station and which view is indicated by line 6—6 on Figure 7.

Figure 7 is a view indicated by line 7—7 on Figure 6.

Figure 8 is a view diagrammatically illustrating the electric circuit for the operation of the turntable when the drive motor is intermittently started and stopped.

Figure 9 is a view similar to Figure 8, but shows the arrangement employed when the motor operates continuously and is intermittently connected with the turntable by means of a clutch.

Referring to the drawings somewhat more in detail, Figure 1 illustrates a portion of the checking-in counter at a typical airport, and it will be seen to consist of a counter 10 having a checking-in station at 12, including a scale 14 and a second checking-in station 16, including a scale 18.

Each station may include a scale platform 25 for weighing in of the passenger, whereby complete control of both passenger and luggage weight can be had.

Positioned immediately in front of each checking-in station on the passenger seat of counter 10 is a rotary turntable 20 having thereon a plurality of seats or stools 22. The turntable 20 is spaced from counter 10 sufficient distance to permit the passenger to be checked free of movement from the turntable, and there is preferably provided a turnstile 24 which each passenger turns a quarter revolution in moving into the checking-in station. A guard rail 26 permits movement of the passenger in only one direction and a second guard rail 28 separates the two checking-in stations from each other.

Referring to Figures 2, 3, and 4, it will be seen that the turntable may comprise an elevated central part 30 having rails 32 thereon that provide space for receiving the passenger's luggage. Optionally, the passengers may place their luggage on the floor of the turntable or on the ledge 34 extending outwardly from the lowermost portion of the turntable.

The turntable may be mounted on an annular track 36, best seen in Figure 4, and which it engages by means of a plurality of rollers 38 carried in brackets secured to the underneath side of the turntable.

For driving the turntable, there is provided an electric motor M which drives through a gear reduction unit 40 into a pinion 42 that meshes with a ring gear 44 carried by the turntable.

For controlling the indexing of the turntable from place to place, I employ the control circuit of Figure 8, and in which figure the power lines are represented at L-1 and L-2. Between the power lines is connected the coil of a relay R-1 in series with the parallel-arranged normally open switches 46 and 48. Switch 46 is one of a pair of switches arranged on the passenger agent side of counter 10, as indicated by the numeral 46 in Figure 1. Switch 48, on the other hand, is positioned so as to be actuated by turnstile 24 when it is rotated by a passenger passing therethrough. The arrangement of switch 48 will be seen in Figures 6 and 7, wherein it will be observed that switch 48 is stationarily mounted on the column 50 of the turnstile and which column rotatably supports a cap 52 from which the bars 54 project. Bars 54 have their inner ends positioned so that each quarter revolution of the turnstile brings about momentary closing of switch 48.

Relay R-1 has a first blade 56 through which a holding circuit is established for relay R-1 through a limit switch 58 which is normally closed and which is positioned to be engaged and actuated by one of the rollers 38 carried by the turntable when the turntable reaches a predetermined position. It will be evident that there will be as many of the rollers 38 as there are stations on the turntable so that switch 58 will be actuated each time the turntable indexes one space.

Relay R–1 also has a blade 60 thereon that establishes a circuit from power line L–2 to drive motor M for the turntable. Merely closing relay R–1, however, will not serve to energize motor M because it is in circuit with a normally open blade 62 of a second relay R–2. Relay R–2 has its coil in series with a normally open push button 64 which comprises the second one of the manual push buttons that are positioned on the agent's side of counter 10 as indicated by numeral 64 in Figure 1.

Relay R–2 also has a blade 66 that establishes a holding circuit therefor, and which holding circuit is broken when switch 58 is opened.

In operation, a passenger stepping over the turntable in the checking-in position will turn turnstile 24 ninety degrees and this will bring about momentary closing of switch 48 thereby to energize relay R–1. Thereafter, following the checking in of the passenger, the passenger agent will close switch 64 and which will bring about energization of relay R–2 thereby to energize motor M to start rotation of the turntable. When the turntable has turned far enough to bring about opening of switch 58, both relays R–1 and R–2 will be de-energized and the energization of motor M will cease. Due to the inertia of the moving parts, the turntable will coast beyond the position where switch 58 is opened so that the entire system is ready for a new cycle of operations.

It will be understood, of course, that latch bolt means or the like could be provided for determining with greater precision the exact stopping points on the turntable, but for most purposes, it is believed that it will be satisfactory merely to de-energize the motor M and permit the turntable to coast to a halt.

Should it not be desirable to energize and de-energize motor M, the circuit of Figure 8 can be modified in the manner illustrated in Figure 9. In Figure 9 the same reference numerals are employed and the only difference is that motor M is continuously connected between lines L–1 and L–2 and the connection of the motor to the turntable is accomplished by an electrically-operated clutch mechanism 68 which, when energized, closes the clutch 69 that drivingly connects motor M with the turntable.

In either of the circuits of Figure 8 or Figure 9, should it happen to be necessary to index the turntable more than one space at any time, as for example, when one of the seats thereon was unoccupied, this can be accomplished by the passenger agent from his side of the counter by first pressing switch 46 which will bring about energization of relay R–1 and then pressing switch 64 in the usual manner to initiate an indexing cycle. In normal operations, however, it is of advantage to have the passenger in line with the checking-in station step through the turnstile thus to prepare the energizing circuit for the drive means whereby the passenger agent will not inadvertently index the turntable at an improper time. Indexing of the turntable solely by the agent can only be accomplished by a conscious two-step operation on his part. On the other hand, placing the turntable partly under the control of the agent prevents the passengers from crowding into the checking-in station as they might do if the indexing of the turntable were under the sole control of the passengers or of the turnstile switch.

From the foregoing it will be seen that what I have invented is an improved method and apparatus particularly adapted for use under the circumstances described for the checking in of passengers, particularly at airports, for the sake of avoiding confusion and insuring that the passengers are handled in the proper order. It will be evident, however, that the method and apparatus of this invention are not necessarily limited in utility to use in an airport, but could be employed in any other circumstance where a number of persons to be dealt with had to be treated at one particular location.

It will also be apparent that many changes and modifications could be made in the apparatus and in the manner of its use within the scope of the invention. For example, the turntable could be mounted to rotate on a central supporting column, if desired. Further the turntable could be arranged so that the passengers could be checked in without even leaving their seats and in which case, the turnstile could be eliminated and the indexing of the turntable accomplished solely by the agent.

It will be understood, therefore, that this invention is susceptible to modification in order to adopt it to different usages and conditions and, accordingly, it is desired to comprehend such modifications within this invention as may fall within the scope of the appended claims.

I claim:

1. In an arrangement of the nature described for use at a counter having a checking in station: a conveyor movable past the said station comprising a plurality of passenger positions, a drive energizable to move the conveyor one passenger space, normally ineffective means under the control of the checking in agent for energizing said drive, and means operated by the passengers during their movement from the conveyor through the said station for making said normally ineffective means effective.

2. In an arrangement of the nature described for use at a counter having a checking in station: a conveyor movable past the said station comprising a plurality of passenger positions, a drive energizable to move the conveyor one passenger space, means under the combined control both of the passengers passing through the checking in station from the conveyor and of the checking in agent for energizing said drive, and other means under the sole control of said agent for energizing said drive.

3. In combination with a counter or the like for checking in passengers and including a checking in station: a turntable, seating means for passengers to be checked in spaced around the turntable, driving means to drive the turntable one space during each period of effectiveness of the said driving means, said turntable including space to receive the passenger's luggage adjacent the seating means, and means under the combined control both of the passengers leaving the turntable at the checking in station and of the checking in agent for making said driving means effective.

4. In combination with a counter or the like for checking in passengers and including a checking in station: a turntable, an electric motor to drive the turntable in rotation, control means energizable for making the said motor effective to accomplish the said driving and de-energizable to halt the said driving, means operated by the checking in agent for energizing said control means, and means responsive to an angular travel of the turntable equal to the angle between adjacent of said seating means for de-energizing said control means, said motor being continuously energized, and said control means comprising a clutch to connect the motor with the turntable.

5. In combination with a counter or the like for checking in passengers and including a checking in station: a turntable, seating means for passengers to be checked in spaced around the turntable, driving means to drive the turntable one space during each period of effectiveness of the said driving means, said turntable including space to receive the passenger's luggage adjacent the seating means, a turnstile through which the passengers pass in going from the turntable through the checking in station, means operated by movement of the turnstile for preparing a control circuit the completion of which will make said driving means effective, and means operated by the checking in agent for completing said control circuit after the said preparation thereof.

6. In combination with a counter or the like for checking in passengers and including a checking in station: a turntable, seating means for passengers to be checked in spaced around the turntable, driving means to drive the turntable one space during each period of effectiveness of the said driving means, said turntable including space to receive the passenger's luggage adjacent the seating means, a turnstile through which the passengers pass in going from the turntable through the checking in station, means operated by movement of the turnstile for preparing a control circuit the completion of which will make said driving means effective, and means operated by the checking in agent for completing said control circuit after the said preparation thereof, there being other means adapted for operation by the agent for completing said circuit independently of the turnstile operated means.

References Cited in the file of this patent

UNITED STATES PATENTS

| | | |
|---|---|---|
| 655,681 | Beamer | Aug. 14, 1900 |
| 746,615 | Washburn | Dec. 8, 1903 |
| 1,355,488 | McKenney | Oct. 12, 1920 |
| 1,512,640 | Rump | Oct. 21, 1924 |
| 1,819,017 | Drake | Aug. 18, 1931 |
| 2,290,275 | Childers | July 21, 1942 |
| 2,292,763 | Lennox | Aug. 11, 1942 |
| 2,649,932 | Bessonette | Aug. 25, 1953 |